US011994724B2

(12) United States Patent
Wright et al.

(10) Patent No.: US 11,994,724 B2
(45) Date of Patent: May 28, 2024

(54) CHIP-TO-CHIP OPTICAL DATA COMMUNICATION SYSTEM

(71) Applicant: Ayar Labs, Inc., Santa Clara, CA (US)

(72) Inventors: Alexandra Wright, Oakland, CA (US); Mark Wade, Berkeley, CA (US); Chen Sun, Berkeley, CA (US); Vladimir Stojanovic, Berkeley, CA (US); Rajeev Ram, San Francisco, CA (US); Milos Popovic, San Francisco, CA (US); Roy Edward Meade, Lafayette, CA (US); Derek Van Orden, San Francisco, CA (US)

(73) Assignee: Ayar Labs, Inc., Santa Clara, CA (US)

( * ) Notice: Subject to any disclaimer, the term of this patent is extended or adjusted under 35 U.S.C. 154(b) by 0 days.

(21) Appl. No.: 17/671,525

(22) Filed: Feb. 14, 2022

(65) Prior Publication Data

US 2022/0171142 A1 Jun. 2, 2022

Related U.S. Application Data

(63) Continuation of application No. 16/937,428, filed on Jul. 23, 2020, now Pat. No. 11,249,260, which is a
(Continued)

(51) Int. Cl.
*G02B 6/293* (2006.01)
*G02B 6/42* (2006.01)
*G02B 6/43* (2006.01)

(52) U.S. Cl.
CPC ........ *G02B 6/4202* (2013.01); *G02B 6/2934* (2013.01); *G02B 6/4216* (2013.01); *G02B 6/4219* (2013.01); *G02B 6/4287* (2013.01)

(58) Field of Classification Search
CPC .. G02B 6/4202; G02B 6/2934; G02B 6/4216; G02B 6/4219; G02B 6/4287; G02B 6/43; G02B 6/4215
See application file for complete search history.

(56) References Cited

U.S. PATENT DOCUMENTS 6,049,639 A 4/2000 Paniccia et al.
6,690,845 B1 2/2004 Yoshimura et al.
(Continued)

OTHER PUBLICATIONS

PCT/US20/43338, International Search Report and Written Opinion, Mailed Oct. 20, 2020.
(Continued)

*Primary Examiner* — Ryan A Lepisto
(74) *Attorney, Agent, or Firm* — Penilla IP, APC

(57) ABSTRACT

An optical input/output chiplet is disposed on a first package substrate. The optical input/output chiplet includes one or more supply optical ports for receiving continuous wave light. The optical input/output chiplet includes one or more transmit optical ports through which modulated light is transmitted. The optical input/output chiplet includes one or more receive optical ports through which modulated light is received by the optical input/output chiplet. An optical power supply module is disposed on a second package substrate. The second package substrate is separate from the first package substrate. The optical power supply module includes one or more output optical ports through which continuous wave laser light is transmitted. A set of optical fibers optically connect the one or more output optical ports of the optical power supply module to the one or more supply optical ports of the optical input/output chiplet.

20 Claims, 5 Drawing Sheets

Related U.S. Application Data continuation-in-part of application No. 15/650,586, filed on Jul. 14, 2017, now Pat. No. 10,771,160.

(60) Provisional application No. 62/878,295, filed on Jul. 24, 2019, provisional application No. 62/362,551, filed on Jul. 14, 2016.

(56) References Cited

U.S. PATENT DOCUMENTS

| | | | | |
|---|---|---|---|---|
| 8,929,694 | B2* | 1/2015 | Beausoleil | G06F 13/4063 |
| | | | | 385/24 |
| 9,201,287 | B1* | 12/2015 | Taylor | G02F 7/00 |
| 9,323,011 | B1* | 4/2016 | Feng | G02B 6/4225 |
| 9,608,733 | B2 | 3/2017 | Pavlas et al. | |
| 9,722,705 | B2 | 8/2017 | Blumenthal et al. | |
| 11,573,294 | B2* | 2/2023 | Sun | G01S 7/4911 |
| 2014/0079082 | A1* | 3/2014 | Feng | H01S 5/101 |
| | | | | 372/20 |
| 2015/0358087 | A1 | 12/2015 | Pavlas et al. | |
| 2016/0036550 | A1 | 2/2016 | Welch | |
| 2016/0149662 | A1 | 5/2016 | Soldano et al. | |
| 2016/0156149 | A1* | 6/2016 | Takabayashi | H01S 5/142 |
| | | | | 372/6 |
| 2017/0261705 | A1 | 9/2017 | Kim et al. | |
| 2018/0019820 | A1 | 1/2018 | Sun et al. | |
| 2018/0067888 | A1 | 3/2018 | Sheth et al. | |
| 2018/0159294 | A1* | 6/2018 | Bovington | H04L 12/64 |
| 2018/0217344 | A1 | 8/2018 | Fini et al. | |
| 2019/0044640 | A1* | 2/2019 | Stern | H04J 14/04 |
| 2020/0158964 | A1 | 5/2020 | Winzer et al. | |

OTHER PUBLICATIONS

Noam Ophir et la., "Silicon Photonic Microring Links for High-Bandwidth-Density, Low-Power Chip I/O," IEEE Micro, vol. 33, No. 1, Jan. 1, 2013, pp. 54-67.

* cited by examiner

CHIP-TO-CHIP OPTICAL DATA COMMUNICATION SYSTEM

CLAIM OF PRIORITY

This application is a continuation application under 35 U.S.C. 120 of prior U.S. Non-Provisional application Ser. No. 16/937,428, filed on Jul. 23, 2020, which:
1) claims priority under 35 U.S.C. 119(e) to U.S. Provisional Patent Application No. 62/878,295, filed Jul. 24, 2019, and
2) is a continuation-in-part (CIP) application under 35 U.S.C. 120 of U.S. patent application Ser. No. 15/650,586, filed on Jul. 14, 2017, issued as U.S. Pat. No. 10,771,160, on Sep. 8, 2020, which claims priority under 35 U.S.C. 119(e) to U.S. Provisional Patent Application No. 62/362,551, filed on Jul. 14, 2016.

The disclosures of U.S. application Ser. Nos. 16/937,428; 62/878,295; 15/650,586; and 62/362,551 are incorporated herein by reference in their entirety for all purposes. The disclosure of U.S. Pat. No. 10,771,160 is incorporated herein by reference in its entirety for all purposes.

BACKGROUND

Optical communications have been used for data communication in internet networks, such as Ethernet networks, for several decades. In such implementations, optical transceivers are made of multiple components and encased in connector cages such as small form-factor pluggable (SFP) and quad small form-factor pluggable (QSFP28) cages. These cages contain components required for optical data transmission and reception, such as light generation, optical modulation, photodetection, and electrical control circuitry. Optical data is output on optical fibers, which transmit data several meters or several kilometers to a destination.

To date, optical data communication systems have utilized the above-mentioned pluggable and discrete form factors, such as SFP and QSFP28, for printed circuit board (PCB) level input/output (I/O) applications. However, these pluggable and discrete form factors are far too large to achieve a density needed for chip-level input/output (I/O) applications. Although recent attempts to bring optics closer to the connected host chip, such as the on-board form factors explored by COBO (Consortium for On-Board Optics), have motivated tighter form factors, the types of optical devices and integration methods used in contemporary optical transceivers are not suitable for chip-level I/O applications, from both a size perspective and a power perspective. It is within this context that the present invention arises.

SUMMARY

In an example embodiment, an optical data communication system is disclosed. The optical data communication system includes a first package substrate. The optical data communication system also includes an optical input/output chiplet disposed on the first package substrate. The optical input/output chiplet includes one or more supply optical ports for receiving continuous wave light. The optical input/output chiplet includes one or more transmit optical ports through which modulated light is transmitted by the optical input/output chiplet. The optical input/output chiplet includes one or more receive optical ports through which modulated light is received by the optical input/output chiplet. The optical data communication system also includes a system-on-chip disposed on the first package substrate. The system-on-chip is electrically connected to the optical input/output chiplet through routings of electrical traces formed within the first package substrate. The optical data communication system also includes a second package substrate separate from the first package substrate. The optical data communication system also includes an optical power supply module disposed on the second package substrate. The optical power supply module includes one or more output optical ports through which continuous wave laser light is transmitted. The optical data communication system also includes a set of optical fibers optically connecting the one or more output optical ports of the optical power supply module to the one or more supply optical ports of the optical input/output chiplet.

In an example embodiment, a method is disclosed for optical data communication. The method includes operating an optical input/output chiplet disposed on a first package substrate to receive an input modulated light stream through a first optical fiber. The method also includes operating the optical input/output chiplet to receive the input modulated light stream to generate an input electrical data signal. The method also includes operating an optical power supply module disposed on a second package substrate to generate continuous wave laser light. The second package substrate is separate from the first package substrate. The method also includes transmitting the continuous wave laser light through a second optical fiber to the optical input/output chiplet. The method also includes operating the optical input/output chiplet to modulate the continuous wave laser light in accordance with an output electrical data signal to generate an output modulated light stream. The method also includes operating the optical input/output chiplet to transmit the output modulated light stream through a third optical fiber to a network link. The method also includes operating the optical input/output chiplet to receive electrical data signals from a system-on-chip disposed on the first package substrate through electrical traces routed within the first package substrate. The method also includes operating the optical input/output chiplet to transmit electrical data signals to the system-on-chip disposed on the first package substrate through electrical traces routed within the first package substrate.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1A:
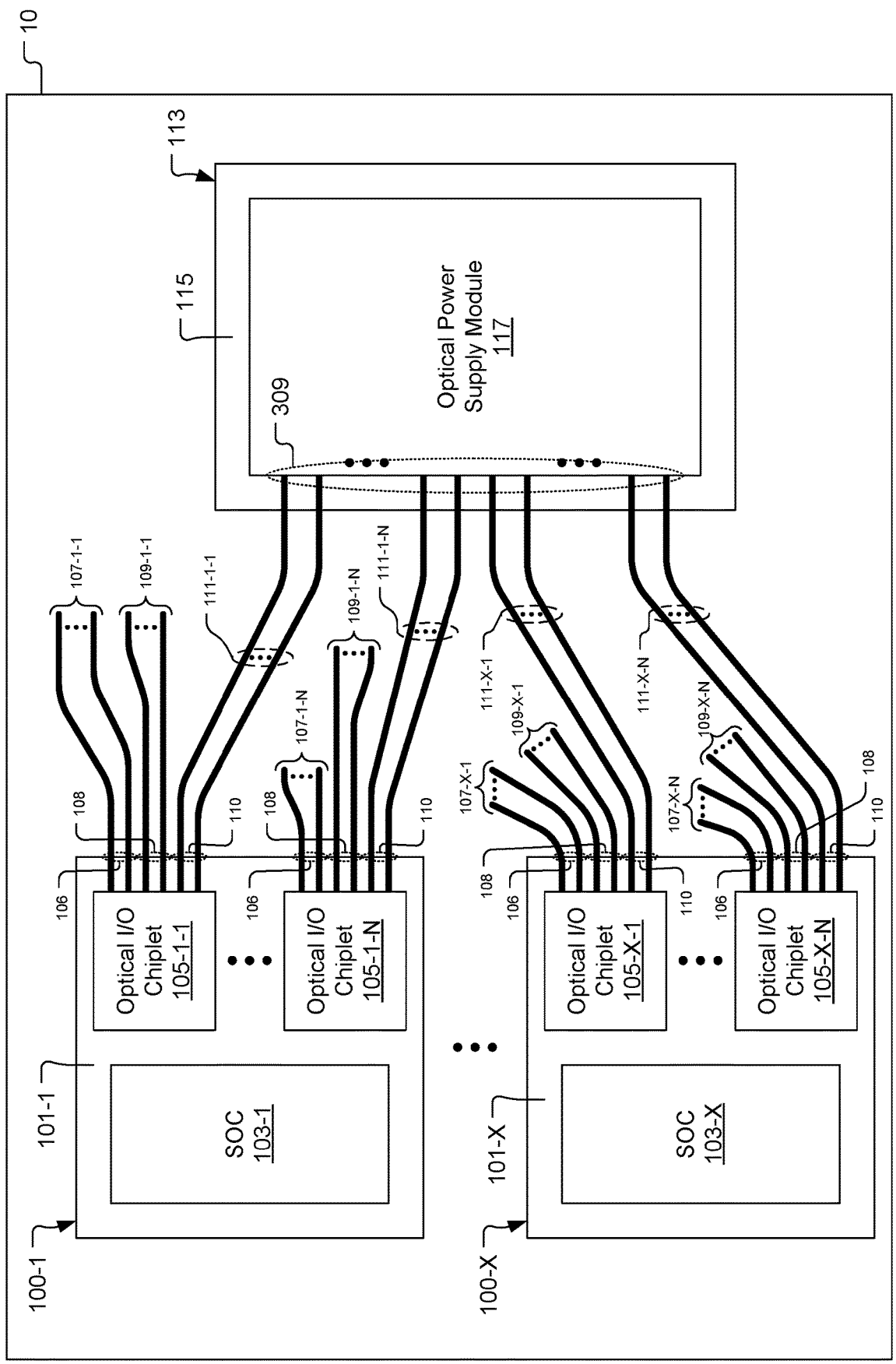
FIG. 1A describes an optical data communication system for chip-to-chip data communication inside a computing device, in accordance with some embodiments.

FIG. 1A describes an optical data communication system 10 for chip-to-chip data communication inside a computing device, in accordance with some embodiments. The optical data communication system 10 of FIG. 1A can be implemented inside any type of computing device, such as inside a server computer system, inside a data center, inside a client computing system, or inside a consumer electronic device, such as a desktop computer, a laptop computer, a cell phone, a tablet computer, a virtual reality device, and an augmented reality device, among others. In some embodiments, the optical data communication system 10 of FIG. 1A is implemented within a single rack in a data center, either in a single blade/box or across multiple blades/boxes. In some embodiments, the optical data communication system 10 of FIG. 1A is implemented across multiple racks in a data center. The optical communication system 10 of FIG. 1A can also be used to connect multiple servers or consumer electronic devices. The optical communication system 10 of FIG. 1A includes two primary components, namely an optical input/output (I/O) chiplet 105-1-1 and an optical power supply module 117, that are optically connected to each other in a chip-to-chip manner by optical fibers 111-1-1.

The optical I/O chiplet 105-1-1 is disposed on a package substrate 101-1 within a multi-chip package 100-1. In some embodiments, the multi-chip package 100-1 includes a number (N) of optical I/O chiplets 105-1-1 to 105-1-N, where the number (N) is greater than one. However, in some embodiments, the multi-chip package 100-1 can include a single optical I/O chiplet 105-1-1. The multi-chip package 100-1 also includes a host system-on-chip (SOC) 103-1 or similar type of computer chip device. In this manner, the optical I/O chiplets 105-1-1 to 105-1-N are packaged on the same multi-chip package 100-1 as the host SOC 103-1. In various embodiments, the host SOC 103-1 can be a central processing unit (CPU), a graphics processing unit (GPU), an application-specific integrated circuit (ASIC), a field programmable gate array (FPGA), a switch, an accelerator, or another type of computer chip device. Each of the optical I/O chiplets 105-1-1 to 105-1-N is a semiconductor (computer) optical-electronic chip that includes optical modulators, photodetectors, optical wavelength multiplexers and demultiplexers, electrical controllers and drivers for optical devices, and electrical input and output for data communication from and to the host SOC 103-1.

In various embodiments, the package substrate 101-1 can be an organic substrate or a ceramic substrate, or essentially any other type of substrate upon which electronic devices and/or optical-electronic devices and/or optical waveguides and/or optical fiber(s)/fiber ribbon(s) can be mounted. For example, in some embodiments, the package substrate 101-1 can be an Indium-Phosphide (III-V) substrate. Or, in another example, the package substrate 101-1 can be an $Al_2O_3$ substrate. It should be understood that in various embodiments the optical I/O chiplets 105-1-1 to 105-1-N and the host SOC 103-1 can be attached/mounted to the package substrate 101-1 using essentially any known electronic packaging process, such as flip-chip bonding, which can optionally include disposition of a ball grid array (BGA), bumps, solder, under-fill, and/or other component(s), between the optical I/O chiplets 105-1-1 to 105-1-N and the package substrate 101-1, and between the host SOC 103-1 and the package substrate 101-1, and can include bonding techniques such as mass reflow, thermal-compression bonding (TCB), or essentially any other suitable bonding technique.

In some embodiments, the optical data communication system 10 includes one multi-chip package 100-1. However, in some embodiments, the optical data communication system 10 includes a number (X) of multi-chip packages 100-1 to 100-X, where the number (X) is greater than one. In some embodiments, the number (X) of multi-chip packages 100-1 to 100-X are disposed on a same printed circuit board (PCB). However, in some embodiments, the number (X) of multi-chip packages 100-1 to 100-X are disposed across multiple separate PCB's. In some embodiments, each of the multi-chip packages 100-1 to 100-X is configured in a same manner, such that each of the multi-chip packages 100-1 to 100-X includes a corresponding package substrate 101-1 to 101-X, a corresponding host SOC 103-1 to 103-X, and a corresponding set of the number (N) of optical I/O chiplets 105-1-1 to 105-1-N through 105-X-1 to 105-X-N. However, in some embodiments, different ones of the multi-chip packages 100-1 to 100-X have different configurations, such as by having different numbers of the optical I/O chiplets 105-1-1 to 105-1-N disposed thereon.

For ease of description, the reference numeral 105 is used in reference to all of the optical I/O chiplets 105-1-1 to 105-1-N through 105-X-1 to 105-X-N. Also, for ease of description, the reference numeral 103 is used in reference to all of the host SOC's 103-1 to 103-X. In various embodiments, the optical I/O chiplets 105 are co-packaged with the corresponding host SOC 103 using a variety of technologies (including organic substrate, 2.5D integration—Si interposer, embedded interconnect bridge, high-density build-up fanout, among others) as appropriate for the electrical I/O interface of the corresponding host SOC 103. In some embodiments, the optical I/O chiplets 105 are designed to adapt to the electrical I/O interface of the host SOC 103, so as to optimize I/O bandwidth density, energy efficiency, and packaging costs for a given application. The optical I/O chiplets 105 route data electrically to and from the host SOC 103 through metal traces (e.g., copper traces) formed in the package substrate 101-1 to 101-X. The package substrate 101-1 to 101-X also delivers power and ground to the optical I/O chiplets 105 and the host SOC 103.

The optical I/O chiplets 105 transmit data in the form of modulated light streams through optical fibers and receive data in the form of modulated light streams through optical fibers. Each of the optical I/O chiplets 105 includes one or more receive optical ports 108 through which modulated light is received by the optical I/O chiplet 105. The one or more receive optical ports 108 of each optical I/O chiplet 105 are optically coupled to a corresponding number of receive optical fibers 109-1-1 to 109-1-N. Each of the optical I/O chiplets 105 also includes one or more supply optical ports 110 through which continuous wave laser light is received by the optical I/O chiplet 105. The one or more supply optical ports 110 of each optical I/O chiplet 105 are optically coupled to a corresponding number of supply optical fibers 111-1-1 to 111-1-N. The supply optical fibers 111-1-1 to 111-1-N are optically coupled to optical output ports 309 of the optical power supply module 117. Each of the optical I/O chiplets 105 also includes one or more transmit optical ports 106 through which modulated light is transmitted by the optical I/O chiplet 105. The one or more transmit optical ports 106 of each optical I/O chiplet 105 are optically coupled to a corresponding number of transmit optical fibers 107-1-1 to 107-1-N.

The optical power supply module 117 is disposed on a second package substrate 115 within a chip package 113. It should be understood that the second package substrate 115 is physically separate from the first package substrates 101-1 to 101-X of the multi-chip packages 100-1 to 100-X. In some embodiment, the optical power supply module 117 is implemented as a single chip on the second package substrate 115. However, in some embodiments, the optical power supply module 117 is implemented as multiple chips on the second package substrate 115. In these embodiments, the chip package 113 is a multi-chip package 113.

The optical power supply module 117 is configured to generate one or more wavelengths of continuous wave laser light and output the generated continuous wave laser light through the supply optical fibers 111-1-1 to 111-1-N through 111-X-1 to 111-X-N, which route the continuous wave laser light to the various optical I/O chiplets 105 across the multi-chip packages 100-1 to 100-X. Again, it should be understood that the optical power supply module 117 includes one or more chips on the second package substrate 115 that is separate from the package substrates 101-1 to 101-X of the multi-chip packages 100-1 to 100-X that includes the optical I/O chiplets 105 and the host SOC's 103. The optical power supply module 117 receives electrical power and electrical ground through routings of electrically conductive (e.g., copper) traces formed within the package substrate 115.

Figure 2:
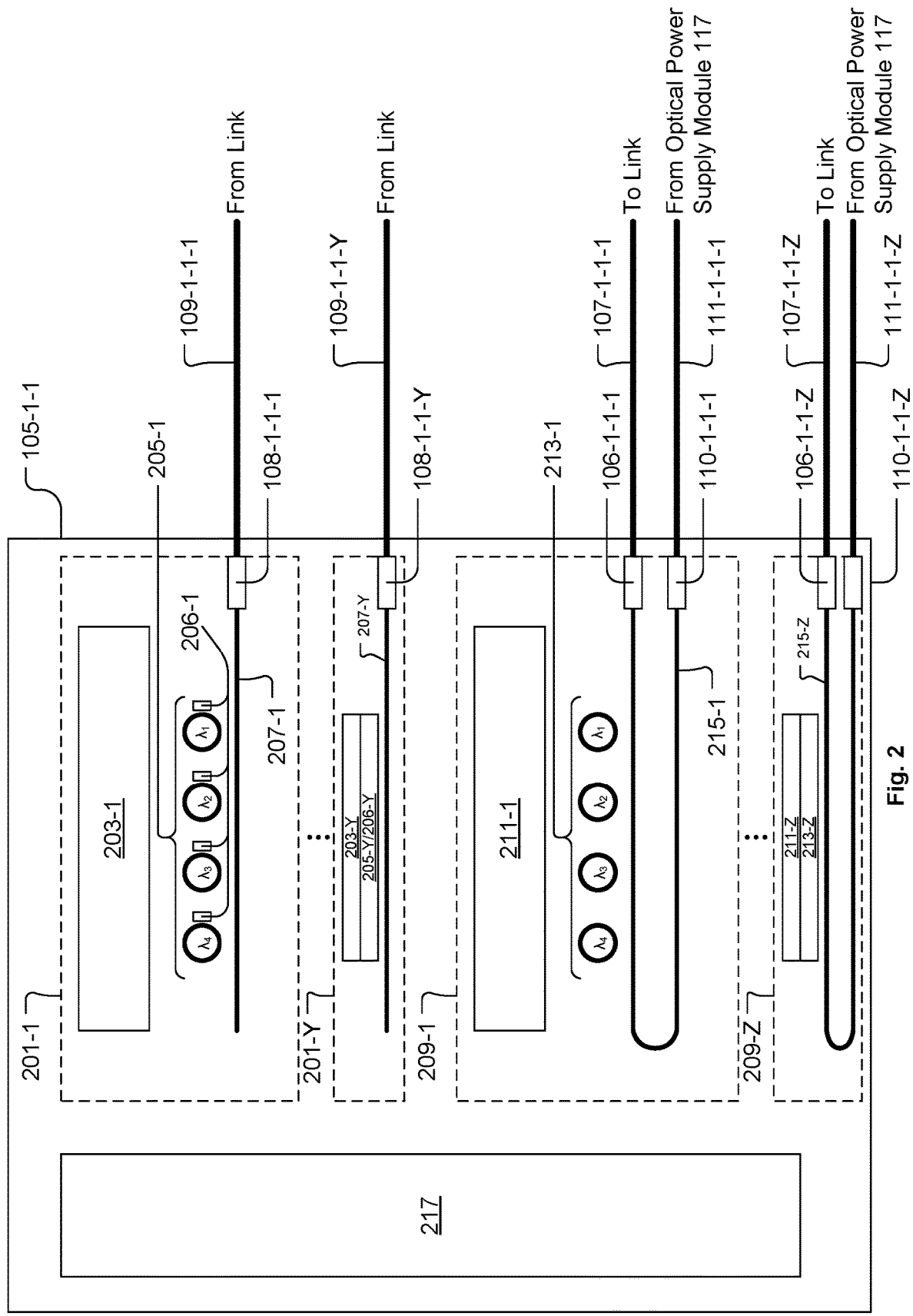
FIG. 2 shows a diagram of the optical I/O chiplet, in accordance with some embodiments.

FIG. 2 shows a diagram of the optical I/O chiplet 105-1-1, in accordance with some embodiments. The optical I/O chiplet 105-1-1 is representative of the other optical I/O chiplets 105. The optical I/O chiplet 105-1-1 includes a number (Y) of receive macros 201-1 to 201-Y. Each receive macro 201-1 to 201-Y includes a corresponding receive optical waveguide 207-1 to 207-Y that is optically coupled to a corresponding one of the receive optical ports 108-1-1-1 to 108-1-1-Y, which is optically coupled to a corresponding one of the receive optical fibers 109-1-1-1 to 109-1-1-Y. In this manner, a modulated light stream travels through the receive optical fibers 109-1-1-1 to 109-1-1-Y and into the corresponding receive optical waveguides 207-1 to 207-Y. The receive optical waveguides 207-1 to 207-Y convey the received modulated light streams past corresponding optical circuitry 205-1 to 205-Y. The optical circuitry 205-1 to 205-Y is operated by corresponding electrical circuitry 203-1 to 203-Y. The optical circuitry 205-1 to 205-Y and corresponding electrical circuitry 203-1 to 203-Y is configured to detect the modulated light streams and convert the modulated light streams into corresponding electrical data signals. In various embodiments, the optical circuitry 205-1 to 205-Y includes optical detectors, which may be micro-ring detectors, linear detectors, photodetectors, or any optical device that absorbs a modulated light signal and generates a corresponding electrical current that is detectable by electronic receiver circuits within the electrical circuitry 203-1 to 203-Y. In some embodiments, the optical circuitry 205-1 to 205-Y includes different optical components disposed along and proximate to the corresponding receive optical waveguides 207-1 to 207-Y (close enough to couple light into the optical components from the receive optical waveguides 207-1 to 207-Y). In some embodiments, the different optical components of the optical circuitry 205-1 to 205-Y are configured to detect particular wavelengths of light. In this manner, multiple modulated light signals of different wavelengths can be simultaneously received into the receive optical waveguides 207-1 to 207-Y, and can be simultaneously detected and received by the combination of the optical circuitry 205-1 to 205-Y and electrical circuitry 203-1 to 203-Y.

The optical I/O chiplet 105-1-1 also includes a number (Y) of transmit macros 209-1 to 209-Z. Each transmit macro 209-1 to 209-Z includes a corresponding transmit optical waveguide 215-1 to 215-Z that is optically coupled to a corresponding one of the supply optical ports 110-1-1-1 to 110-1-1-Z, which is optically coupled to a corresponding one of the supply optical fibers 111-1-1-1 to 111-1-1-Z. In some embodiments, the transmit optical waveguides 215-1 to 215-Z are substantially U-shaped. Continuous wave laser light travels through the supply optical fibers 111-1-1-1 to 111-1-1-Z and into the corresponding transmit optical waveguides 215-1 to 215-Z. The transmit optical waveguides 215-1 to 215-Z convey the received continuous wave laser light past corresponding optical circuitry 213-1 to 213-Z. The optical circuitry 213-1 to 213-Z is operated by corresponding electrical circuitry 211-1 to 211-Z. The combination of optical circuitry 213-1 to 213-Z and corresponding electrical circuitry 211-1 to 211-Z is configured to modulate (encode data on) the continuous wave laser light within the transmit optical waveguides 215-1 to 215-Z to generate output modulated light streams within the transmit optical waveguides 215-1 to 215-Z. The generated output modulated light streams are transmitted from the transmit optical waveguides 215-1 to 215-Z through the transmit optical ports 106-1-1-1 to 106-1-1-Z and into the transmit optical fibers 107-1-1-1 to 107-1-1-Z and on to the network link. In various embodiments, the optical circuitry 213-1 to 213-Z includes optical modulators which may be micro-ring resonator modulators, Mach-Zehnder modulators, or any electro-optic device designed to encode data in optical signals. Also, in some embodiments, the optical circuitry 213-1 to 213-Z includes different optical components disposed along and proximate to the corresponding transmit optical waveguides 215-1 to 215-Z (close enough to couple light into the optical components from the transmit optical waveguides 215-1 to 215-Z). In some embodiments, the different optical components of the optical circuitry 213-1 to 213-Z are configured to operate on particular wavelengths of light. In this manner, multiple modulated light signals of different wavelengths can be simultaneously generated and transmitted through each of the transmit optical waveguides 215-1 to 215-Z, and in turn through each of the transmit optical fibers 107-1-1-1 to 107-1-1-Z.

The optical I/O chiplet 105-1-1 also includes electrical circuitry 217 that operates to electrically transmit data from the optical I/O chiplet 105-1-1 to the host SOC 103-1, and that operates to electrically receive data from the host SOC 103-1. The electrical circuitry 217 of the optical I/O chiplet 105-1-1 is electrically connected to the host SOC 103-1 through electrically conductive traces formed in the package substrate 101-1. The electrical circuitry 217 is configured to handle all electrical I/O for the optical I/O chiplet 105-1-1. In some embodiments, the electrical circuitry 217 is disposed on one side of the optical I/O chiplet 105-1-1, and the photonic interface for optical coupling with the optical fibers (107-1-1-1 to 107-1-1-Z, 109-1-1-1 to 109-1-1-Y, and 111-1-1-1 to 111-1-1-Z) is laid out along the opposite side of the optical I/O chiplet 105-1-1. In some embodiments, the photonic interface of the optical I/O chiplet 105-1-1 includes respective optical grating couplers for each of the receive optical ports 108, the supply optical ports 110, and the transmit output ports 106. In various embodiments, the photonic interface of the optical I/O chiplet 105-1-1 can include vertical optical grating couplers, edge optical couplers, or essentially any other type of optical coupling device, or combination thereof to enable optical coupling of the optical fibers (107-1-1-1 to 107-1-1-Z, 109-1-1-1 to 109-1-1-Y, and 111-1-1-1 to 111-1-1-Z) with the optical I/O chiplet 105-1-1.

Figure 3:
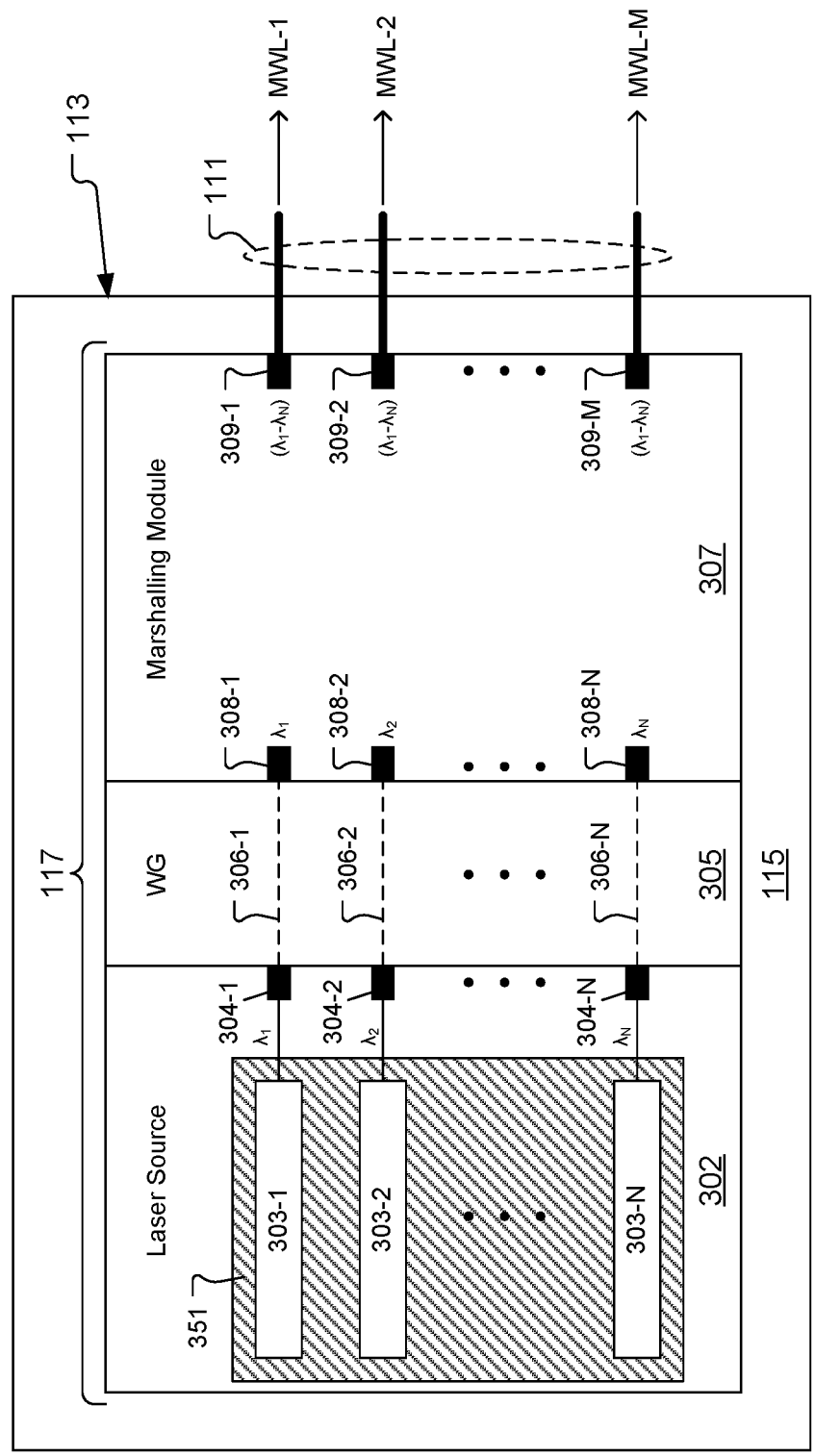
FIG. 3 shows a diagram of the optical power supply module, in accordance with some embodiments.

FIG. 3 shows a diagram of the optical power supply module 117, in accordance with some embodiments. The optical power supply module 117 includes a laser source 302 and an optical marshalling module 307. The laser source 302 is configured to generate and output a plurality of laser beams, i.e., (N) laser beams. The plurality of laser beams have different wavelengths ($\lambda_1$-$\lambda_N$) relative to each other, where the different wavelengths ($\lambda_1$-$\lambda_N$) are distinguishable to an optical data communication system. In some embodiments, the laser source 302 includes a plurality of lasers 303-1 to 303-N for respectively generating the plurality (N) of laser beams, where each laser 303-1 to 303-N generates and outputs a laser beam at a respective one of the different wavelengths ($\lambda_1$-$\lambda_N$). Each laser beam generated by the plurality of lasers 303-1 to 303-N is provided to a respective optical output port 304-1 to 304-N of the laser source 302 for transmission from the laser source 302. In some embodiments, each of the plurality of lasers 303-1 to 303-N is a distributed feedback laser configured to generate laser light at a particular one of the different wavelengths ($\lambda_1$-$\lambda_N$). In some embodiments, the laser source 302 can be defined as a separate component, such as a separate chip. However, in other embodiments, the laser source 302 can be integrated within a planar lightwave circuit (PLC) on a chip that includes other components in addition to the laser source 302.

In the example embodiment of FIG. 3, the laser source 302 is defined as a separate component attached to the package substrate 115, such as an electronic packaging substrate. In various embodiments, the substrate 115 can be an organic substrate or a ceramic substrate, or essentially any other type of substrate upon which electronic devices and/or optical-electronic devices and/or optical waveguides and/or optical fiber(s)/fiber ribbon(s) can be mounted. For example, in some embodiments, the substrate 115 can be an Indium-Phosphide (III-V) substrate. Or, in another example, the substrate 115 can be an $Al_2O_3$ substrate. It should be understood that in various embodiments the laser source 302 can be attached/mounted to the substrate 115 using essentially any known electronic packaging process, such as flip-chip bonding, which can optionally include disposition of a ball grid array (BGA), bumps, solder, under-fill, and/or other component(s), between the laser source 302 and the substrate 115, and include bonding techniques such as mass reflow, thermal-compression bonding (TCB), or essentially any other suitable bonding technique.

The optical marshalling module 307 is configured to receive the plurality of laser beams of the different wavelengths ($\lambda_1$-$\lambda_N$) from the laser source 302 at a corresponding plurality of optical input ports 308-1 to 308-N of the optical marshalling module 307. The optical marshalling module 307 is also configured to distribute a portion of each of the plurality of laser beams to each of a plurality of optical output ports 309-1 to 309-M of the optical marshalling module 307, where (M) is the number of optical output ports of the optical marshalling module 307. The optical marshalling module 307 operates to distribute the plurality of laser beams such that all of the different wavelengths ($\lambda_1$-$\lambda_N$) of the plurality of laser beams are provided to each of the plurality of optical output ports 309-1 to 309-M of the optical marshalling module 307. Therefore, it should be understood that the optical marshalling module 307 operates to provide light at all of the different wavelengths ($\lambda_1$-$\lambda_N$) of the plurality of laser beams to each one of the optical output ports 309-1 to 309-M of the optical marshalling module 307, as indicated in FIG. 3. In this manner, for the optical power supply module 117, each one of the optical output ports 309-1 to 309-M of the optical marshalling module 307 provides a corresponding one of a plurality of multi-wavelength laser outputs MWL-1 to MWL-M onto a corresponding one of the supply optical fibers 111, where the reference numeral 111 represents all of the supply optical fibers 111-1-1 to 111-1-N to 111 through 111-X-1 to 111-X-N.

In some embodiments, the optical marshalling module 307 is configured to maintain a polarization of each of the plurality of laser beams between the plurality of optical input ports 308-1 to 308-N of the optical marshalling module 307 and the plurality of optical output ports 309-1 to 309-M of the optical marshalling module 307. Also, in some embodiments, the optical marshalling module 307 is configured such that each of the plurality of optical output ports 309-1 to 309-M of the optical marshalling module 307 receives a similar amount of optical power of any given one of the plurality of laser beams within a factor of five. In other words, in some embodiments, the amount of light of a given wavelength, i.e., one of the different wavelengths ($\lambda_1$-$\lambda_N$), that is provided by the optical marshalling module 307 to a particular one of the optical output ports 309-1 to 309-M is the same within a factor of five to the amount of light of the given wavelength that is provided by the optical marshalling module 307 to others of the optical output ports 309-1 to 309-M. It should be understood that the factor of five mentioned above is an example embodiment. In other embodiments, the factor of five mentioned above can be changed to a factor of another value, such as to a factor of two, or three, or four, or six, etc., or to any other value in between or less than or greater than. The point to be understood is that the optical marshalling module 307 can be configured to control the amount of light of a given wavelength that is provided to each of the optical output ports 309-1 to 309-M of the optical marshalling module 307, and in turn can be configured to control a uniformity of the amount of light of a given wavelength provided to each of the optical output ports 309-1 to 309-M of the optical marshalling module 307.

In the example embodiment, of FIG. 3, the optical marshalling module 307 is defined as a separate component attached to the package substrate 115. Therefore, it should be understood that in the example embodiment of the optical power supply module 117, the laser source 302 and the optical marshalling module 307 are physically separate components. It should be understood that in various embodiments the optical marshalling module 307 can be attached/mounted to the package substrate 115 using essentially any known electronic packaging process. Also, in some embodiments, the optical marshalling module 307 is configured as a non-electrical component, i.e., as a passive component, and can be attached/mounted to the package substrate 115 using techniques that do not involve establishment of electrical connections between the optical marshalling module 307 and the package substrate 115, such as by use of an epoxy or other type of adhesive material. In some embodiments, rather than being defined as a separate component, the optical marshalling module 307 can be integrated within a planar lightwave circuit (PLC) on a chip that includes other components in addition to the optical marshalling module 307. In some embodiments, both the optical marshalling module 307 and the laser source 302 are implemented together within a same PLC.

The laser source 302 is aligned with the optical marshalling module 307 to direct the plurality of laser beams transmitted from the optical outputs 304-1 to 304-N of the laser source 302 into respective ones of the optical input ports 308-1 to 308-N of the optical marshalling module 307.

In some embodiments, the optical marshalling module 307 is positioned spaced apart from the laser source 302. In some embodiments, the optical marshalling module 307 is positioned in contact with the laser source 302. And, in some embodiments, a portion of the optical marshalling module 307 is positioned to overlap a portion of the laser source 302. In the example embodiment of the optical power supply module 117 as shown in FIG. 3, the optical marshalling module 307 is positioned spaced apart from the laser source 302, and an optical waveguide 305 is positioned between the laser source 302 and the optical marshalling module 307. The optical waveguide 305 is configured to direct the plurality of continuous wave laser beams from the laser source 302 into respective ones of the plurality of optical input ports 308-1 to 308-N of the optical marshalling module 307, as indicated by lines 306-1 to 306-N.

In various embodiments, the optical waveguide 305 can be formed of essentially any material through which light can be channeled from an entry location on the optical waveguide 305 to an exit location on the optical waveguide 305. For example, in various embodiments, the optical waveguide 305 can be formed of glass, SiN, SiO2, germanium-oxide, and/or silica, among other materials. In some embodiments, the optical waveguide 305 is configured to maintain a polarization of the plurality of laser beams between the laser source 302 and the optical marshalling module 307. In some embodiments, the optical waveguide 305 includes (N) optical conveyance channels, where each optical conveyance channel extends from a respective one of the optical output ports 304-1 to 304-N of the laser source 302 to a respective one of the optical input ports 308-1 to 308-N of the optical marshalling module 307. In some embodiments, each of the (N) optical conveyance channels of the optical waveguide 305 has a substantially rectangular cross-section in a plane normal to a direction of propagation of the laser beam, i.e., normal to the x-direction as shown in FIG. 3, which serves to maintain a polarization of the laser beam as it propagates from the laser source 302 to the optical marshalling module 307.

In the example embodiment of FIG. 3, the optical waveguide 305 is defined as a separate component attached to the package substrate 115. Therefore, it should be understood that in the example embodiment of the optical power supply module 117, the laser source 302, the optical waveguide 305, and the optical marshalling module 307 are physically separate components. It should be understood that in various embodiments the optical waveguide 305 can be attached/mounted to the package substrate 115 using essentially any known electronic packaging process. Also, in some embodiments, the optical waveguide 305 is configured as a non-electrical component, i.e., as a passive component, and can be attached/mounted to the package substrate 115 using techniques that do not involve establishment of electrical connections between the optical waveguide 305 and the package substrate 115, such as by use of an epoxy or other type of adhesive material. In some embodiments, rather than being defined as a separate component, the optical waveguide 305 can be integrated within a PLC on a chip that includes other components in addition to the optical waveguide 305. In some embodiments, laser source 302, the optical waveguide 305, and the optical marshalling module 307 are implemented together within a same PLC.

In some embodiments, the optical power supply module 117 includes a thermal spreader component 351 disposed proximate to the laser source 302. The thermal spreader component 351 is configured to spread a thermal output of the plurality of lasers 303-1 to 303-N to provide substantial uniformity in temperature-dependent wavelength drift among the plurality of lasers 303-1 to 303-N. In some embodiments, the thermal spreader component 351 is included within the laser source 302. In some embodiments, the thermal spreader component 351 is included within the package substrate 115. In some embodiments, the thermal spreader component 351 is defined separate from each of the laser source 302, the optical marshalling module 307, and the package substrate 115. In some embodiments, the thermal spreader component 351 is included within the optical marshalling module 307, with the thermal spreader component 351 portion of the optical marshalling module 307 physically overlapping the laser source 302. In some embodiments, the thermal spreader component 351 is included within the optical waveguide 305, with the thermal spreader component 351 portion of the optical waveguide 305 physically overlapping the laser source 302. In various embodiments, the thermal spreader component 351 is formed of a thermally conductive material, such as a metallic material by way of example. In some embodiments, the thermal spreader component 351 can incorporate an element configured to actively transfer heat away from the plurality of lasers 303-1 to 303-N, such as a thermoelectric cooler by way of example. Also, in some embodiments, the thermal spreader component 351 is formed to have a sufficient bulk mass so as to function as a heat sink for heat emanating from the plurality of lasers 303-1 to 303-N of the laser source 302.

In view of the foregoing, the optical power supply module 117 includes the laser source 302 and the optical marshalling module 307. The laser source 302 is configured to generate and output a plurality of laser beams. The plurality of laser beams have different wavelengths relative to each other. The different wavelengths are distinguishable to the optical data communication system. The optical marshalling module 307 is configured to receive the plurality of laser beams from the laser source 302 and distribute a portion of each of the plurality of laser beams to each of the plurality of optical output ports 309-1 to 309-M of the optical marshalling module 307, such that all of the different wavelengths of the plurality of laser beams are provided to each of the plurality of optical output ports 309-1 to 309-M of the optical marshalling module 307. Also, in some embodiments, one or more optical amplifying module(s), such as a semiconductor optical amplifier (SOA), can be included to amplify laser light output from the optical output ports 309-1 to 309-M of the optical marshalling module 307 and provide the amplified laser light as output from the optical power supply module 117. Various configurations of the optical power supply module 117 (or "laser module") are disclosed in co-pending U.S. patent application Ser. No. 15/650,586, which is incorporated herein by reference in its entirety for all purposes.

In view of the foregoing, in some embodiments, an optical data communication system 10 is disclosed to include a first package substrate 101-1 and an optical input/output chiplet 105-1-1 disposed on the first package substrate 101-1. The optical input/output chiplet 105-1-1 includes one or more supply optical ports 110 for receiving continuous wave light, such as through the supply optical fibers 111-1-1. The optical input/output chiplet 105-1-1 includes one or more transmit optical ports 106 through which modulated light is transmitted by the optical input/output chiplet 105-1-1, such as through the transmit optical fibers 107-1-1. The optical input/output chiplet 105-1-1 also includes one or more receive optical ports 108 through which modulated light is received by the optical input/output chiplet 105-1-1, such as through the receive optical fibers 109-1-1.

The optical data communication system 10 also includes a second package substrate 115 separate from the first package substrate 101-1. In some embodiments, both the first package substrate 101-1 and the second package substrate 115 are disposed inside of a single computing device. The optical data communication system 10 includes an optical power supply module 117 disposed on the second package substrate 115. The optical power supply module 117 includes one or more output optical ports 309-1 to 309-M through which continuous wave laser light is transmitted, such as through the supply optical fibers 111-1-1. The optical data communication system 10 also includes a set of optical fibers 111-1-1 optically connecting the one or more output optical ports 309-1 to 309-M of the optical power supply module 117 to the one or more supply optical ports 110 of the optical input/output chiplet 105-1-1.

In some embodiments, the optical input/output chiplet 105-1-1 includes one or more receive optical waveguides 207-1 to 207-Y respectively optically coupled to the one or more receive optical ports 108 to which the receive optical fibers 109-1-1-1 to 109-1-1-Y are optically coupled. Also, the optical input/output chiplet 105-1-1 includes one or more receive optical ring resonators 205-1 to 205-Y disposed proximate to each of the one or more receive optical waveguides 207-1 to 207-Y, so as to couple light into the receive optical ring resonators 205-1 to 205-Y from the one or more receive optical waveguides 207-1 to 207-Y. In some embodiments, each of the one or more receive optical ring resonators 205-1 to 205-Y is configured to couple in light of a particular wavelength. In some embodiments, the optical input/output chiplet 105-1-1 includes one or more photodetectors 206-1 to 206-Y respectively optically coupled to the one or more receive optical ring resonators 205-1 to 205-Y. Each of the one or more photodetectors 206-1 to 206-Y is configured to generate a photocurrent proportional to an amount of light of the particular wavelength coupled into the corresponding receive optical ring resonator 205-1 to 205-Y.

In some embodiments, the optical input/output chiplet 105-1-1 includes one or more transmit optical waveguides 215-1 to 215-Z. Each of the one or more transmit optical waveguides 215-1 to 215-Z has a first end optically coupled to a corresponding one of the one or more supply optical ports 110 to which the supply optical fibers 111-1-1-1 to 111-1-1-Z are optically coupled. Each of the one or more transmit optical waveguides 215-1 to 215-Z has a second end optically coupled to a corresponding one of the one or more transmit optical ports 106 to which the transmit optical fibers 107-1-1-1 to 107-1-1-Z are optically coupled. In some embodiments, each of the one or more transmit optical waveguides 215-1 to 215-Z has a substantially U-shaped configuration. In some embodiments, the optical input/output chiplet 105-1-1 includes one or more transmit optical ring modulators 213-1 to 213-Z disposed proximate to each of the one or more transmit optical waveguides 215-1 to 215-Z. The one or more transmit optical ring modulators 213-1 to 213-Z are configured to generate an output modulated light stream in the corresponding transmit optical waveguide 215-1 to 215-Z.

Figure 1B:
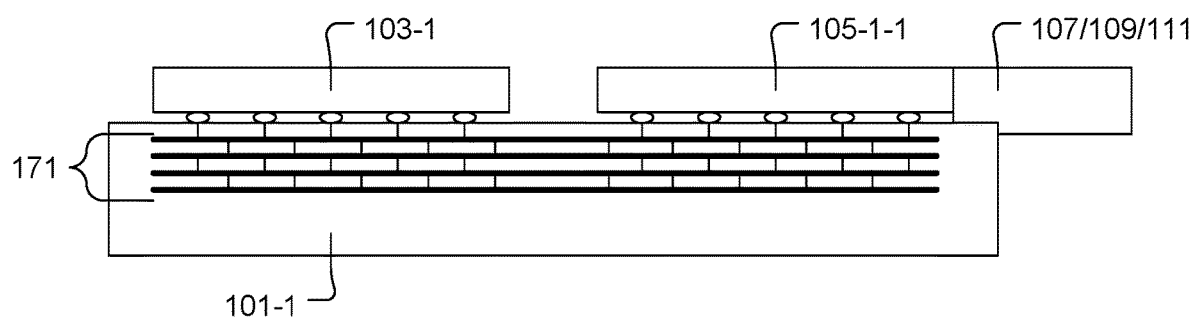
FIG. 1B shows a vertical cross-section diagram of the multi-chip package of FIG. 1A, in accordance with some embodiments.

In some embodiments, the first package substrate 101-1 includes routings of electrical traces configured to carry electrical power, electrical ground, electrical data input signals, and electrical data output signals for the optical input/output chiplet 105-1-1. In some embodiments, a host system-on-chip 103-1 is disposed on the first package substrate 101-1. The host system-on-chip 103-1 is electrically connected to the optical input/output chiplet 105-1-1 through routings of electrical traces formed within the first package substrate 101-1. FIG. 1B shows a vertical cross-section diagram of the multi-chip package 100-1 of FIG. 1A, in accordance with some embodiments. In some embodiments, the routings of electrical traces are formed in multiple levels 171 of the first package substrate 101-1. In some embodiments, electrical traces in different levels 171 of the first package substrate 101-1 are electrically connected through electrically conductive via structures, as represented by the vertical lines between different levels 171 in FIG. 1B. It should be understood that in various embodiments the electrical traces in various levels 171 and the conductive via structures between various levels 171 are configured in essentially any manner needed to provide required electrical connectivity between the host system-on-chip 103-1 and the optical input/output chiplet 105-1-1.

In some embodiments, the optical power supply module 117 includes a laser source 302 and a marshalling module 307. The laser source 302 is configured to generate and output a plurality of laser beams of continuous wave light. The plurality of laser beams have different wavelengths ($\lambda_1$-$\lambda_N$) relative to each other. The optical marshalling module 307 is configured to distribute the plurality of laser beams to each of the one or more output optical ports 309-1 to 309-M of the optical power supply module 117, such that all of the different wavelengths ($\lambda_1$-$\lambda_N$) of the plurality of laser beams are provided to each of the one or more output optical ports 309-1 to 309-M of the optical power supply module 117.

Figure 4:
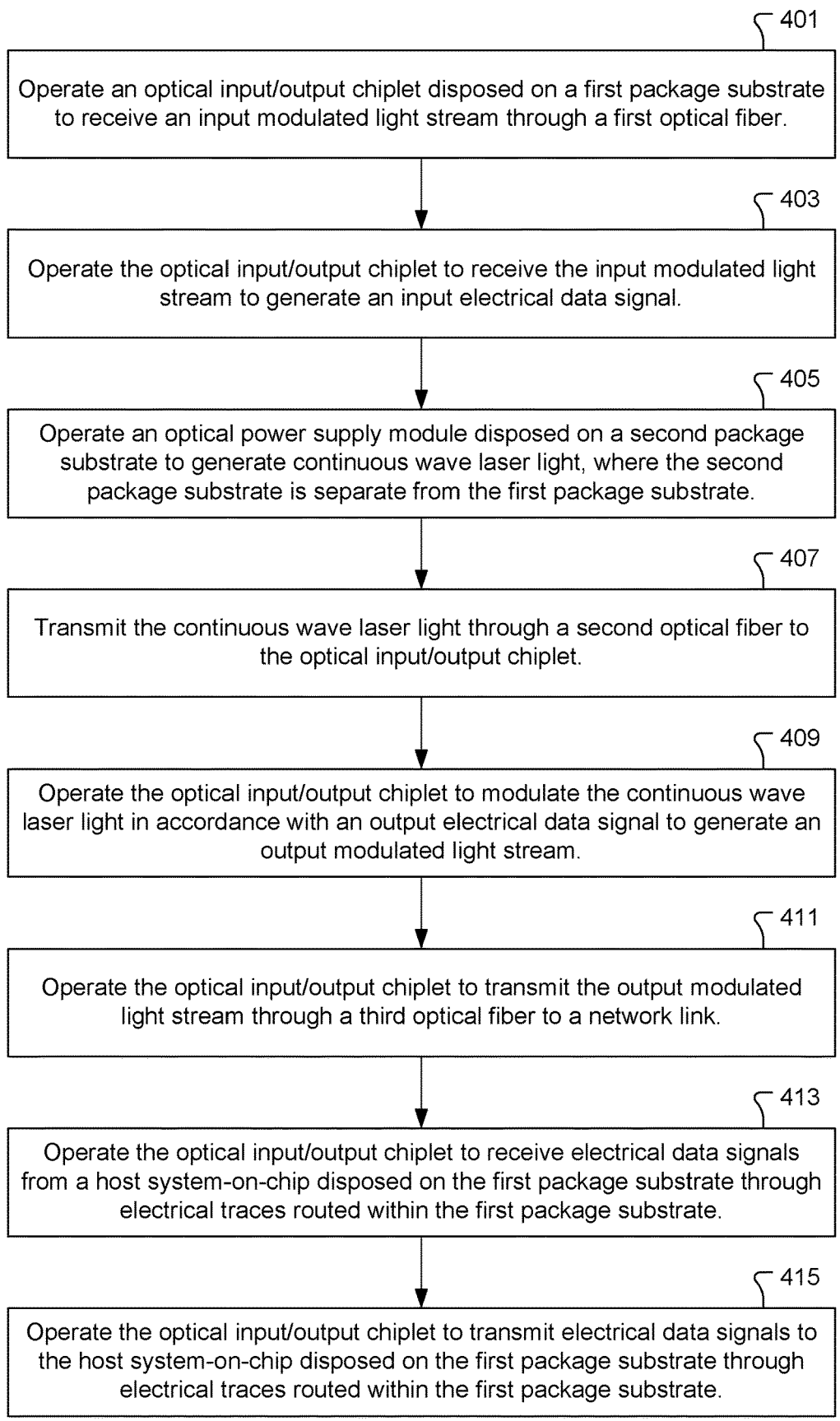
FIG. 4 shows a flowchart of a method for optical data communication, in accordance with some embodiments.

FIG. 4 shows a flowchart of a method for optical data communication, in accordance with some embodiments. The method includes an operation 401 for operating an optical input/output chiplet 105-1-1 disposed on a first package substrate 101-1 to receive an input modulated light stream through a first optical fiber 109-1-1-1 from a network link. The method also includes an operation 403 for operating the optical input/output chiplet 105-1-1 to receive the input modulated light stream to generate an input electrical data signal. The method also includes an operation 405 for operating an optical power supply module 117 disposed on a second package substrate 115 to generate continuous wave laser light. The second package substrate 115 is separate from the first package substrate 101-1. In some embodiments, both the first package substrate 101-1 and the second package substrate 115 are disposed inside of a single computing device. The method also includes an operation 407 for transmitting the continuous wave laser light through a second optical fiber 111-1-1-1 to the optical input/output chiplet 105-1-1. The method also includes an operation 409 for operating the optical input/output chiplet 105-1-1 to modulate the continuous wave laser light in accordance with an output electrical data signal to generate an output modulated light stream. The method also includes an operation 411 for operating the optical input/output chiplet 105-1-1 to transmit the output modulated light stream through a third optical fiber 107-1-1-1 to a network link.

In some embodiments, the method also includes an operation 413 for operating the optical input/output chiplet 105-1-1 to receive electrical data signals from a host system-on-chip 103-1 disposed on the first package substrate 101-1 through electrical traces routed within the first package substrate 101-1. Also, the method includes an operation 415 for operating the optical input/output chiplet 105-1-1 to transmit electrical data signals to the host system-on-chip 103-1 disposed on the first package substrate 101-1 through electrical traces routed within the first package substrate 101-1. In some embodiments, the method includes conveying electrical power, electrical ground, electrical data input signals, and electrical data output signals for the optical input/output chiplet 105-1-1 through electrical traces routed within the first package substrate 101-1.

In some embodiments, operating the optical input/output chiplet 105-1-1 to receive the input modulated light stream to generate the input electrical data signal includes optically coupling the input modulated light stream into a receive optical waveguide 207-1 and optically coupling the input modulated light stream from the receive optical waveguide 207-1 into a receive optical ring resonator 205-1. In some embodiments, the receive optical ring resonator 205-1 is configured to couple in light of a particular wavelength that is equal to a wavelength of the input modulated light stream. In some embodiments, the method includes operating the optical input/output chiplet 105-1-1 to receive the input modulated light stream to generate the input electrical data signal further includes operating a photodetector 206-1 to generate a photocurrent proportional to an amount of light of the particular wavelength that is coupled into the receive optical ring resonator 205-1.

In some embodiments, operating the optical input/output chiplet 105-1-1 to modulate the continuous wave laser light includes transmitting the continuous wave laser light through a transmit optical waveguide 215-1 that has a first end optically coupled to a supply optical port of the optical input/output chiplet 105-1-1 and a second end optically coupled to a transmit optical port of the optical input/output chiplet 105-1-1. In some embodiments, operating the optical input/output chiplet 105-1-1 to modulate the continuous wave laser light further includes optically coupling some of the continuous wave laser light into a transmit optical ring modulator 213-1 to generate the output modulated light stream in the transmit optical waveguide 215-1.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in other embodiment(s), even if not specifically shown or described. The same may also be varied in many ways. Such variations are not to be regarded as a departure from the invention, and all such modifications are intended to be included within the scope of the invention.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the described embodiments.

What is claimed is:

1. An optical data communication system, comprising:
   a package substrate;
   an optical input/output chiplet disposed on the package substrate, the optical input/output chiplet including a supply optical port for receiving continuous wave light from a remote optical power supply, the optical input/output chiplet including a transmit optical port through which modulated light is transmitted by the optical input/output chiplet, wherein the optical input/output chiplet includes a transmit macro having an optical waveguide that extends from the supply optical port to the transmit optical port, the transmit macro including one or more microring resonator modulators disposed within an evanescent optical coupling distance of the optical waveguide, the one or more microring resonator modulators configured to encode digital data onto the continuous wave light received through the supply optical port; and
   a system-on-chip disposed on the package substrate, the system-on-chip electrically connected to the optical input/output chiplet through routings of electrically conductive traces formed within the package substrate.

2. The optical data communication system as recited in claim 1, wherein the optical input/output chiplet is flip-chip bonded to the package substrate.

3. The optical data communication system as recited in claim 1, wherein the system-on-chip is flip-chip bonded to the package substrate.

4. The optical data communication system as recited in claim 1, wherein the transmit macro includes a plurality of microring resonator modulators disposed in a linear arrangement along the optical waveguide and within an evanescent optical coupling distance of the optical waveguide.

5. The optical data communication system as recited in claim 4, wherein the optical waveguide of the transmit macro is U-shaped such that the supply optical port and the transmit optical port are located on a same side of the optical input/output chiplet.

6. The optical data communication system as recited in claim 5, wherein the supply optical port is optically connected to a first optical fiber, and wherein the transmit optical port is optically connected to a second optical fiber.

7. The optical data communication system as recited in claim 1, wherein the optical input/output chiplet includes a receive macro and a receive optical port, the receive macro including an optical waveguide that extends from the receive optical port, the receive macro including one or more microring resonators disposed within an evanescent optical coupling distance of the optical waveguide.

8. The optical data communication system as recited in claim 7, wherein the receive macro includes one or more photodetectors respectively optically coupled to the one or more microring resonators.

9. The optical data communication system as recited in claim 7, wherein the receive optical port, the supply optical port, and the transmit optical port are located on a same side of the optical input/output chiplet.

10. The optical data communication system as recited in claim 9, wherein the supply optical port is optically connected to a first optical fiber, the transmit optical port is optically connected to a second optical fiber, and the receive optical port is optically connected to a third optical fiber.

11. A method for optical data communication, comprising:
    operating an optical input/output chiplet disposed on a package substrate to receive an output electrical data signal from a system-on-chip disposed on the package substrate;
    operating the optical input/output chiplet to receive continuous wave laser light from a remote optical power supply at a supply optical port of a transmit macro within the optical input/output chiplet, the transmit macro having an optical waveguide that extends from the supply optical port to a transmit optical port, the transmit macro having one or more microring resonator modulators disposed within an evanescent optical coupling distance of the optical waveguide, the one or more microring resonators configured to encode digital data onto the continuous wave laser light;

operating the one or more microring resonator modulators to modulate the continuous wave laser light conveyed through the optical waveguide from the supply optical port toward the transmit optical port in accordance with the output electrical data signal to generate an output modulated light stream that conveys an optical encoding of digital data within the output electrical data signal; and operating the optical input/output chiplet to transmit the output modulated light stream through to a network link.

12. The method as recited in claim 11, wherein the output electrical data signal is transmitted from the system-on-chip through electrically conductive traces within the package substrate to the optical input/output chiplet.

13. The method as recited in claim 11, wherein the network link is optically connected to the transmit optical port.

14. The method as recited in claim 11, further comprising:

operating one or more heating devices to respectively control resonant wavelengths of the one or more microring resonator modulators.

15. The method as recited in claim 11, wherein the optical waveguide of a transmit macro is U-shaped, and wherein the supply optical port and the transmit optical port are located on a same side of the optical input/output chiplet.

16. The method as recited in claim 11, further comprising:

operating the optical input/output chiplet to receive modulated light through a receive optical port of the optical input/output chiplet;

operating the optical input/output chiplet to demodulate the received modulated light to generate an input electrical data signal; and operating the optical input/output chiplet to transmit the input electrical data signal to the system-on-chip.

17. The method as recited in claim 16, wherein the input electrical data signal is transmitted from the optical input/output chiplet through electrically conductive traces within the package substrate to the system-on-chip.

18. The method as recited in claim 16, wherein the received modulated light is directed from the receive optical port into an optical waveguide of a receive macro within the optical input/output chiplet, the receive macro including one or more microring resonators disposed within an evanescent optical coupling distance of the optical waveguide.

19. The method as recited in claim 18, further comprising:

operating at least one of the one or more microring resonators to incouple the received modulated light from the optical waveguide and direct the received modulated light to a photodetector within the optical input/output chiplet.

20. The method as recited in claim 19, further comprising:

processing photocurrent generated by the photodetector in response to the received modulated light to generate the input electrical data signal.

\* \* \* \* \*